(12) United States Patent  
Wang et al.

(10) Patent No.: US 8,571,290 B2
(45) Date of Patent: Oct. 29, 2013

(54) AUTOMATED QUANTIFICATION OF DIGITAL RADIOGRAPHIC IMAGE QUALITY

(75) Inventors: Xiaohui Wang, Pittsford, NY (US); Hui Luo, Rochester, NY (US); David H. Foos, Rochester, NY (US); William J. Sehnert, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 959 days.

(21) Appl. No.: 12/486,230

(22) Filed: Jun. 17, 2009

(65) Prior Publication Data

US 2010/0086189 A1    Apr. 8, 2010

Related U.S. Application Data

(60) Provisional application No. 61/103,338, filed on Oct. 7, 2008.

(51) Int. Cl.
*G06K 9/00* (2006.01)

(52) U.S. Cl.
USPC ........... 382/131; 382/181; 382/190; 382/195; 382/224

(58) Field of Classification Search
None
See application file for complete search history.

(56) References Cited

U.S. PATENT DOCUMENTS

| | | | |
|---|---|---|---|
| 6,370,277 B1 | 4/2002 | Borrey et al. | |
| 6,775,399 B1 * | 8/2004 | Jiang | 382/128 |
| 7,090,640 B2 * | 8/2006 | Barth et al. | 600/443 |
| 7,266,229 B2 | 9/2007 | Couwenhoven et al. | |
| 7,321,674 B2 | 1/2008 | Vuylsteke | |
| 7,386,155 B2 | 6/2008 | Foos et al. | |
| 7,466,323 B2 | 12/2008 | Krishnamurthy et al. | |
| 7,860,286 B2 * | 12/2010 | Wang et al. | 382/128 |
| 8,051,386 B2 | 11/2011 | Rosander et al. | |
| 8,270,695 B2 | 9/2012 | Luo et al. | |
| 8,275,201 B2 * | 9/2012 | Rangwala et al. | 382/173 |
| 2004/0258201 A1 * | 12/2004 | Hayashida | 378/62 |
| 2005/0063575 A1 | 3/2005 | Ma et al. | |
| 2005/0089246 A1 * | 4/2005 | Luo | 382/286 |
| 2005/0251013 A1 * | 11/2005 | Krishnan et al. | 600/407 |
| 2005/0256743 A1 | 11/2005 | Dale | |
| 2006/0095429 A1 | 5/2006 | Abhyankar et al. | |
| 2006/0126911 A1 * | 6/2006 | Bohm et al. | 382/132 |
| 2006/0155579 A1 | 7/2006 | Reid | |
| 2006/0274145 A1 * | 12/2006 | Reiner | 348/62 |
| 2006/0274618 A1 * | 12/2006 | Bourret | 369/53.1 |
| 2007/0239377 A1 * | 10/2007 | Reiner | 702/84 |

(Continued)

OTHER PUBLICATIONS

Barrett et al. "Objective assessment of image quality. II. Fisher information, Fourier crosstalk, and figures of merit for task performance", May 1995, J. Opt. Soc. Am., vol. 12, No. 5, pp. 834-852.*

(Continued)

*Primary Examiner* — Matthew Bella
*Assistant Examiner* — Jason Heidemann

(57) ABSTRACT

A method for determining image quality of a digital radiographic image. The method is executed at least in part by a computer system. The method obtains image data for the digital radiographic image, identifies one or more regions of interest in the digital radiographic image, derives an image quality score that indicates the image quality of the digital radiographic image by computing at least a contrast-to-noise value for image data content within the one or more regions of interest, and reports the derived image quality score for the image.

21 Claims, 7 Drawing Sheets

(56) References Cited

U.S. PATENT DOCUMENTS

| | | | |
|---|---|---|---|
| 2007/0253032 A1* | 11/2007 | Keydar et al. | 358/3.27 |
| 2008/0118139 A1 | 5/2008 | Huo et al. | |
| 2008/0152204 A1* | 6/2008 | Huo et al. | 382/132 |
| 2008/0226148 A1* | 9/2008 | Gu et al. | 382/128 |
| 2009/0116713 A1* | 5/2009 | Yan et al. | 382/128 |
| 2010/0036234 A1* | 2/2010 | Pfeuffer | 600/410 |

OTHER PUBLICATIONS

Boone et al. "Dedicated Breast CT: Radiation Dose and Image Quality Evaluation1", Oct. 30, 2001, Radiology, 221, pp. 657-667.*

* cited by examiner

AUTOMATED QUANTIFICATION OF DIGITAL RADIOGRAPHIC IMAGE QUALITY

CROSS REFERENCE TO RELATED APPLICATIONS

Priority is claimed from co-pending U.S. Ser. No. 61/103,338, provisionally filed on Oct. 7, 2008, entitled METHOD FOR AUTOMATIC QUANTIFICATION OF DIGITAL RADIOGRAPHIC IMAGE QUALITY to Wang et al.

Priority is claimed from U.S. Ser. No. 12/485,072 filed on Jun. 16, 2009 entitled DIAGNOSTIC IMAGE PROCESSING WITH AUTOMATIC SELF IMAGE QUALITY VALIDATION to Luo et al.

FIELD OF THE INVENTION

The present invention relates generally to digital radiographic imaging and more particularly to methods for measuring and reporting the image quality of digital radiographic images.

BACKGROUND OF THE INVENTION

Different types of digital radiography, encompassing both storage phosphor-based computed radiography and flat-panel detector-based direct radiography, have been accepted in medical circles as replacements for conventional screen-film radiography and it is acknowledged that they offer improved workflow efficiency and improved capability for overall image quality.

In a digital radiography system, the radiation exposure energy that is captured on radiation sensitive material is converted, pixel by pixel, to electronic digital image data which is then stored in memory circuitry for subsequent processing and display on suitable electronic image display devices. One driving force in the success of digital radiography is the ability to visualize and communicate stored images, via data networks, to one or more remote locations for analysis and diagnosis. This represents a workflow improvement over the handling and processing that is required for screen-film radiography, where exposed film must first be developed and checked, then packaged and delivered to a remote location for diagnosis.

Digital radiography systems have a variable speed and their performance is mostly noise limited. These systems are relatively easier to use, are somewhat more "forgiving" in terms of setup and exposure technique over film systems, and offer some inherent potential for image quality improvement. At the same time, however, the relative ease of operation and reduction of the need for rigorous attention to procedure can have detrimental effects in practice. Ease of operability can tend to make x-ray technologists more relaxed when selecting exposure techniques and in positioning the patient when taking x-ray exams with digital radiography systems. In some cases, this can effect image quality and ultimately impact the radiologists' ability to make proper and timely diagnosis. Thus, the need for Quality Assurance (QA) with digital radiography systems is not reduced. In some cases, the need for QA with the implementation of digital radiography may even be increased somewhat in order to generate x-ray images that have sufficient diagnostic value to the radiologist or clinician.

The quality of a radiographic image can be quantified from a number of aspects. These can include anatomy positioning, exposure coverage, motion, and anatomy contrast-to-noise (CNR) ratio, for example.

Or a radiographic image to be considered diagnostically acceptable, the contrast of the diagnostically relevant anatomical regions over the background noise level must exceed a threshold, so that the radiologist or clinician can overcome the effects of image noise and accurately perceive anatomical details. This suggests that there should be a proportional relationship between CNR and the diagnostic quality of the radiographic image. Thus, an image that exhibits high overall CNR levels is more likely to be acceptable for diagnosis, whereas an image with moderate to low CNR levels may have only borderline clinical value or may even be unacceptable for diagnosis.

The problem of assessing CNR is made more difficult by the relative complexity of various types of radiographic image. Even within any particular radiographic image, CNR can vary depending upon the type of tissue that is imaged in a particular area of the image. CNR is thus a function of both the image exposure level and the anatomical region, and also a function of spatial frequency in the image, where both anatomical features and noise can be distributed differently.

The value of using CNR estimation for image correction and subsequent rendering, such as to enhance or reduce image contrast from raw image data, has been recognized, for example, refer to U.S. Pat. No. 7,321,674 entitled "Method of Normalizing a Digital Signal Representation of an Image" (Vuylsteke '674). Vuylsteke '674 relates to rendering an image based on its overall CNR value, estimated from the histogram that best characterizes the noise image (at the finest scale frequency band) and the histogram that best characterizes image contrast (the fourth finest scale frequency band). In addition, CNR in this method is computed without consideration for how tissue characteristics vary over different areas and at different spatial frequencies. As a result, computed data using techniques such as described Vuylsteke '674 can be misleading, since the diagnostic information of interest may be in a portion of the image having CNR at a different level than the overall CNR of the full image. Further, because this type of method calculates the contrast from a single frequency band (for example, the fourth finest scale frequency band in the Vuylsteke '674 method), it does not capture the broad spatial frequency spectrum of the anatomical regions. An additional problem relates to how this CNR information is used. Once CNR is computed, an image having a poor CNR may still be processed using the same rendering sequence as an image having acceptable CNR, perhaps with different gain or contrast adjustment settings in an attempt to compensate for low CNR. However, if CNR is below a certain minimum level, meaning that noise levels are excessive, no subsequent processing can "rescue" the image content. As a result, using this conventional approach, an image that is of poor quality is simply processed anyway, and sent for radiologist or clinician viewing. This can negatively impact the diagnosis results and merely defers identification and solution of the imaging problem.

Thus, it is seen that there would be benefits to a system that detects image quality problems earlier in the imaging workflow and makes it possible to identify and correct at least some portion of such problems more quickly, allowing the exposures to be re-taken while the patient is still present at the imaging site, for example.

SUMMARY OF THE INVENTION

It is an object of the present invention to advance the art of diagnostic imaging. With this object in mind, the present invention provides a method for determining image quality of a digital radiographic image for a patient, the method executed at least in part by a computer system and comprising: obtaining image data for the digital radiographic image; identifying one or more regions of interest in the digital radiographic image; deriving an image quality score indicative of the quality of the digital radiographic image by computing at least a contrast-to-noise value for image data content within the one or more regions of interest; and reporting the derived image quality score for the image.

From another aspect, the present invention provides a method for evaluating a digital radiographic image, executed at least in part by a computer system, comprising: obtaining the digital radiographic image for a patient; obtaining information about the condition of the patient; identifying one or more regions of interest in the digital radiographic image according to the obtained information about the condition of the patient; computing a contrast-to-noise value for image content within each of the one or more identified regions of interest; combining the computed contrast-to-noise values according to a predetermined profile for deriving a score of digital image quality; and reporting the derived score.

A feature of the present invention is that it computes CNR data for one or more discrete portions of an image that have diagnostic relevance.

It is an advantage of the present invention that it allows a technologist to learn about an imaging problem before the image is sent ahead for further processing and viewing by a radiologist.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
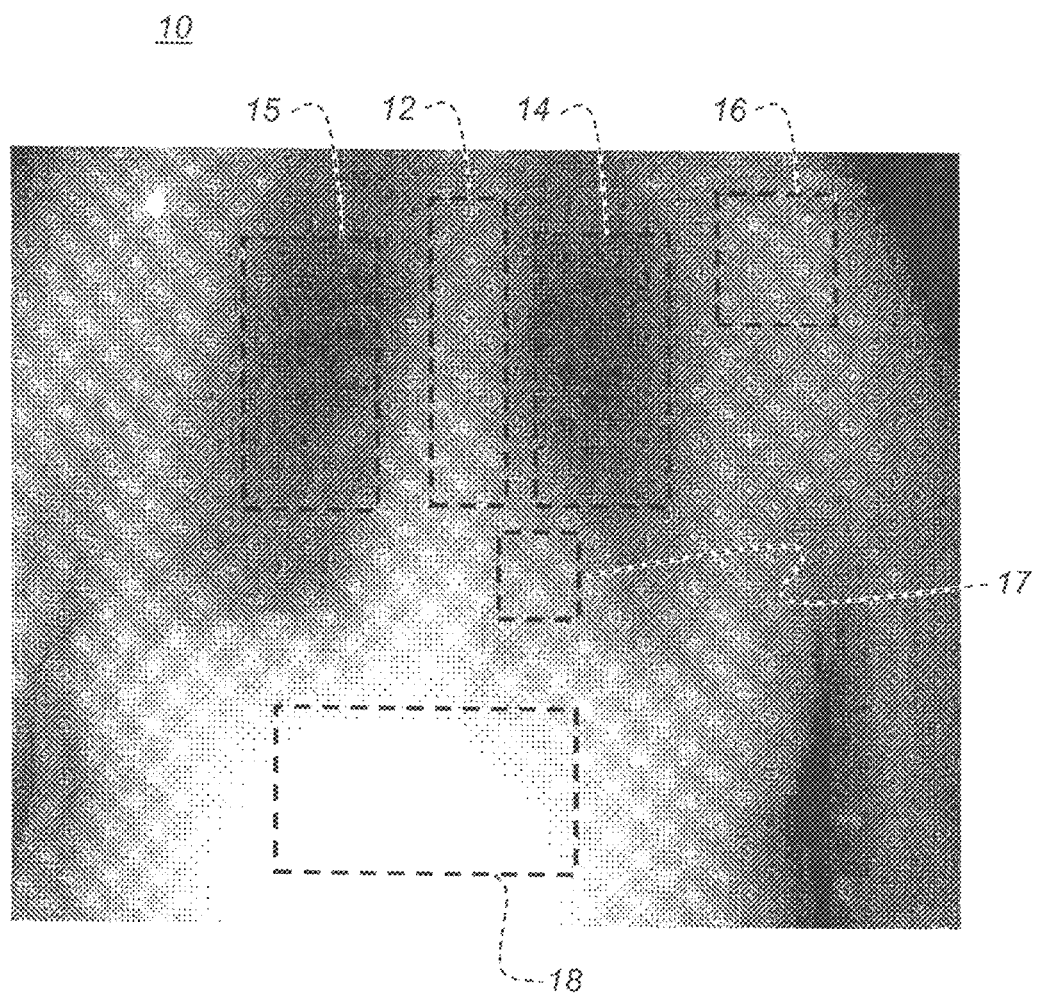
FIG. 1 shows a digital radiography image having multiple regions of interest (ROIs).

The following is a detailed description of the preferred embodiments of the invention, reference being made to the drawings in which the same reference numerals identify the same elements of structure in each of the several figures.

The method of the present invention is executed, at least in part, by a computer or similar logic control processor that executes programmed instructions. The computer may include one or more storage media, for example: magnetic storage media such as magnetic disk (such as a hard disk) or magnetic tape; optical storage media such as optical disk, optical tape, or machine readable bar code; solid-state electronic storage devices such as random access memory (RAM), or read-only memory (ROM); or any other physical devices or media employed to store a computer program having instructions for controlling one or more computers to practice the method according to the present invention. Additional storage hardware may be provided by archival storage systems and devices.

As noted in the Background above, contrast-to-noise ratio (CNR) is one parameter that can be used to characterize overall image quality in digital radiographic imaging applications. Even though CNR is known and has been used for this purpose, however, this value, considered by itself, may not be an indicator of the actual diagnostic value of the image in any particular case.

Embodiments of the present invention address this issue by evaluating CNR as it relates to specific regions of interest (ROIs) in the digital radiographic image (that is, based on the purpose of the exam) as well as the spatial frequencies of each ROI. Referring to FIG. 1, for example, a chest x-ray 10 can have a number of different ROIs. ROIs in this example include a spinal region 12, lung field regions 14 and 15, a shoulder region 16, a heart region 17, and a diaphragm region 18.

Depending on the purpose of an x-ray exam, the requirements for CNR within each ROI can be very different. For example for thoracic exams, the viewing radiologist or clinician may be primarily interested in the lung field region of interest 14 and the heart ROI 17, and may have less interest in other parts of the x-ray, thus only the CNR of lung field ROI 14 and heart ROI 17 is of significant diagnostic relevance for such a case. In another example, for a rib exam, the radiologist or clinician may be primarily interested in rib bone structures instead of in the lung field, thus the CNR for the ROI containing the ribs becomes the most relevant and other areas are of less importance.

Using regional CNR as a measure of image quality can help the x-ray technologist to ensure that proper x-ray exposure (normally, as low as is reasonably achievable) be applied for patient imaging in view of the intended purpose of the x-ray exam. CNR can also be used to guide the x-ray technologist to use an exposure technique that is best suited to the purpose of a particular exam.

It can be appreciated that the example described with reference to FIG. 1 can also apply for other types of images as well as for chest x-rays. That is, because different types of tissue are best imaged using different techniques, such as different exposure settings or with use of a grid, for example, it can be advantageous to evaluate and report CNR more specifically, as it relates to particular ROIs.

Figure 2:
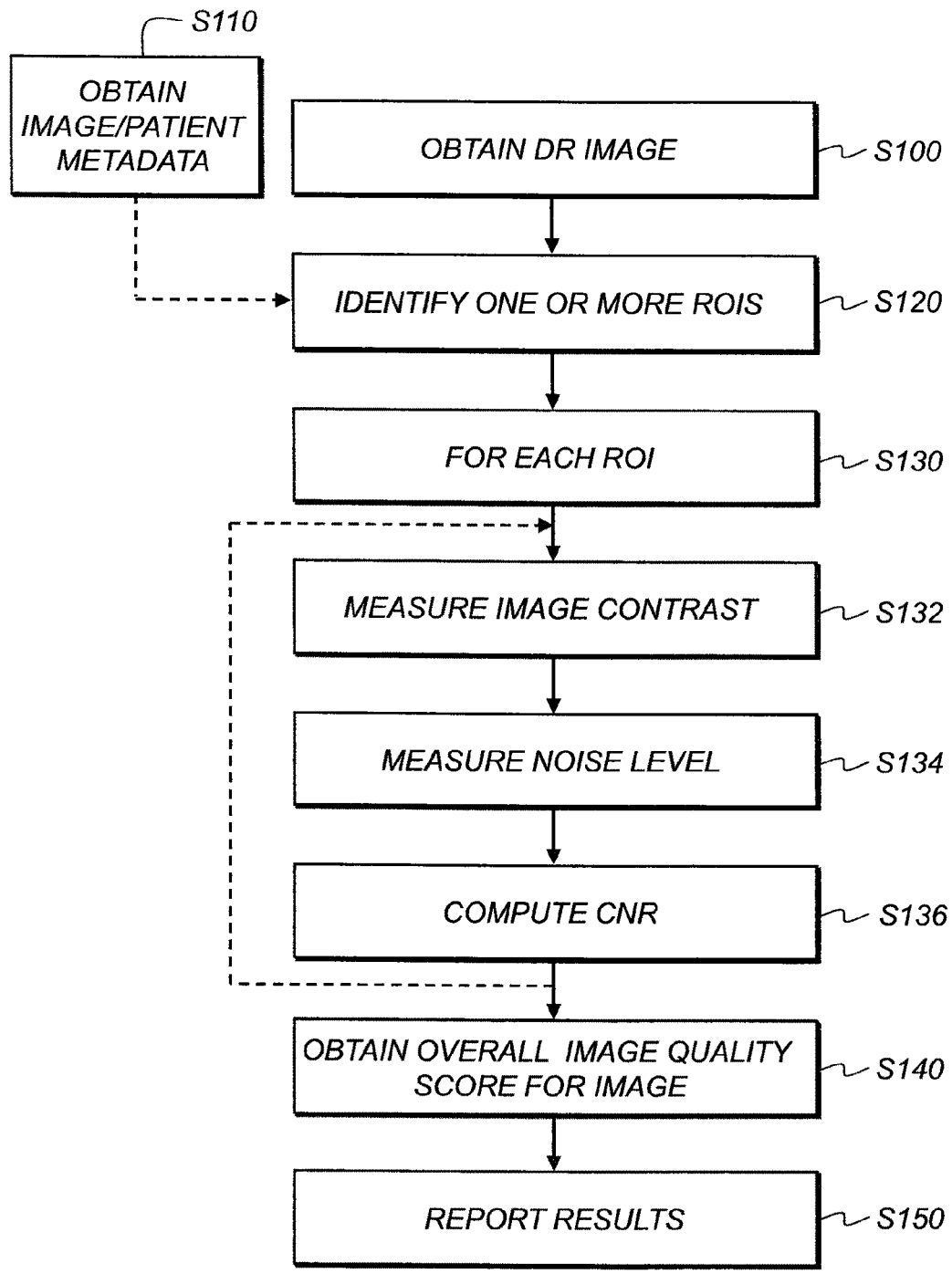
FIG. 2 is a logic flow diagram showing steps for using CNR computation in one embodiment of the present invention.

The logic flow diagram of FIG. 2 shows computer logic for a sequence for automatic digital radiography image quality evaluation that measures and uses CNR information according to one or more ROIs in the image. In an obtain image step S100, a digital radiographic image is obtained from a DR or CR imaging apparatus. The image can be unprocessed "raw" data obtained directly from the radiographic detector or CR scanner or may be rendered data, generated after one or more processing steps, such as after processing for image display, for example. In some embodiments, the image evaluated in this process is electronically stored image data, previously rendered. When unprocessed raw data is used, the CNR quantifies the relative quality of the originally captured image signal itself. For example, large-sized patient images that are captured with an anti-scatter grid have a higher image contrast, wider signal dynamic range, and slightly higher noise level, but higher CNR as compared with the same patient images captured under identical patient exposure levels without a grid. Using the CNR calculation and reporting of embodiments of the present invention can help the x-ray technologist to improve the image acquisition method by promoting the use of a grid when appropriate. When CNR is calculated from the processed image, it can indicate quantitatively whether or not the presentation-ready image is of sufficient diagnostic quality. Further, when the method is applied to the processed image, the CNR can also be used as feedback to the image processing software algorithm for automatic adjustment of the image processing parameters in order to achieve a predetermined CNR and predetermined image quality.

An optional obtain metadata step S110 provides information about the type of image and about its purpose relative to a particular patient. For example, a thoracic x-ray for one patient may be obtained for evaluation of lung fields; a thoracic x-ray for another patient may have been obtained in order to evaluate a rib or spine injury; a thoracic x-ray for a third patient may have been obtained for evaluating a heart condition. This metadata can include information about the patient's condition and can be helpful in subsequent processing for identifying particularly relevant ROIs for this image. At a minimum, some basic metadata is necessary, such as identifying the type of x-ray: chest x-ray, anterior-posterior (AP), (posterior-anterior) PA, or lateral view, mammographic image, or abdominal or limb image, for example. The image metadata may be entered into a computer system by the technologist or may be automatically extracted from a database of patient information systems, such as radiology information system (RIS), or hospital information system (HIS), or the like.

Continuing with the sequence of FIG. 2, an ROI identification step S120 then uses various image analysis and processing techniques and uses information about the image and/or patient in order to perform the necessary segmentation and other steps that identify structures in the image that locate ROIs. Methods for computer-based ROI identification within a radiographic image are well-known and include various types of segmentation, pattern identification, filtering, and other techniques.

As noted earlier, methods of the present invention evaluate CNR within each of one or more ROIs. The results of these evaluations can then be used singly or can be grouped in order to determine the diagnostic efficacy of the image. In the sequence of FIG. 2, CNR is computed for each ROI in a looping step S130 with the sub-steps shown. An image contrast measurement step S132 quantifies image contrast within the ROI. A noise level measurement step S134 provides a noise value. A computation step S136 then computes the CNR for the region of interest from these results. Looping step S130, with its sub-steps S132, S134, and S136, then repeats for each identified ROI in the image.

Once computation of the CNR for each region of interest is concluded, an optional composite Digital Image Quality Score (DIQS) computation step S140 is executed, obtaining a CNR value that is applicable to the full image. A results reporting step S150 then provides the results of CNR computation in some way, such as in the form of an alert to the operator or feedback displayed to a viewer or reported as data to an image processing system or provided as data for use by an administrative system or other networked computer. Results reporting step S150 may provide a summary CNR value for the complete image or, alternately, may provide individual CNR values that are associated with each ROI. A score that is derived for the image could also be provided to another processing system, or displayed, such as a Digital Image Quality Score (DIQS), computed as described in more detail subsequently.

In some cases, there may be only a single ROI in an image that is relevant for a certain diagnostic purpose and the image sequence may be optimized for obtaining the best image for that purpose. For example, only the lung fields in a chest x-ray may be of interest for a particular patient. Techniques for optimizing this type of image, even those that might otherwise compromise image quality relative to other ROIs, may have been practiced by the technologist. Referring to the logic flow diagram of FIG. 3, there is shown an alternate sequence for automatic digital radiography image quality evaluation that measures and uses CNR information for only one ROI in the image. A number of the steps shown for this sequence are the same as those described with reference to FIG. 2. The image is obtained in obtain image step S100. Obtain metadata step S110 provides the information needed to identify the particular ROI that is relevant in an ROI identification step S122. CNR is computed for each ROI in a computation step S138 with its sub-steps S132, S134, and S136, similar to those used in the sequence of FIG. 2. Results reporting step S150 then provides the outcome of CNR calculation that can be directly displayed or otherwise provided to the technologist or used as data for evaluating the technologist or for obtaining data about the image capture technique used, data about facility performance, or information about other aspects of the image capture process.

Figure 3:
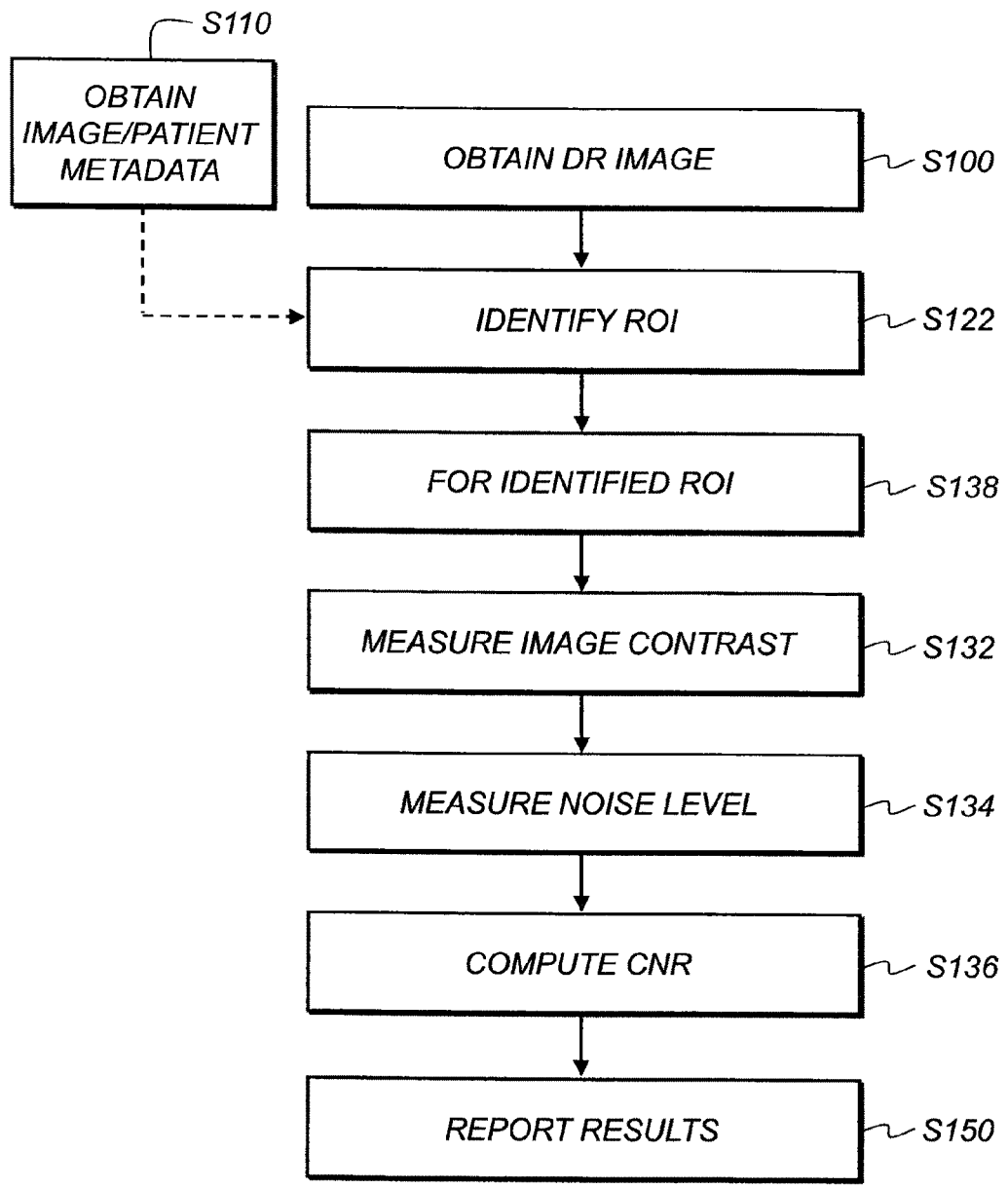
FIG. 3 is a logic flow diagram showing steps for using CNR computation for a single ROI in an alternate embodiment of the present invention.
Figure 4:
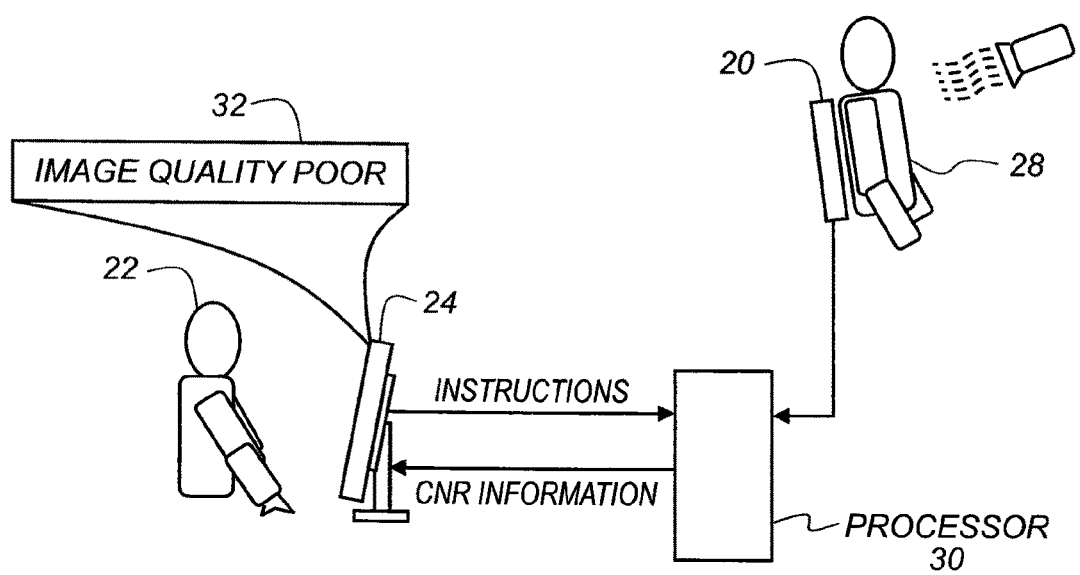
FIG. 4 is a block diagram showing operator interaction using the processing provided in one embodiment.

In one embodiment of the present invention, the sequence shown in FIG. 2 or 3 provides prompt reporting to the technologist of acceptable or unacceptable CNR levels in the image that has just been taken. In this embodiment, shown in the block diagram of FIG. 4, a technologist 22 at a control console 24 initially enters instructions for imaging and provides data such as metadata about the image type or purpose. As noted earlier, this data may be obtained in an automated manner from other sources. A patient 28 is exposed and the image is obtained by a radiographic detector 20 and provided to a processor 30. Processor 30 accesses the image data and performs the evaluation logic described earlier with respect to FIG. 2 or 3 and determines whether or not the x-ray image data that was obtained is acceptable for diagnostic purposes. This information is sent to control console 24 and displayed for the technologist to review. A cautionary message 32 is displayed to alert technologist 22 when image quality for the obtained image is poor. This gives technologist 22 the opportunity to correct any condition (such as patient positioning) or setup variables (such as exposure level, exposure technique, and various image processing parameters, for example) and to retake the image to obtain an improved image.

An alternate embodiment provides a mechanism for monitoring image quality within a department or for determining whether or not training of the x-ray technologists would be particularly useful. In this embodiment, stored images, in rendered format, are accessed, such as from a PACS (Picture Archiving and Communications System) or other archival system. Images from only one department or from only a particular technologist can be accessed and evaluated for image quality based on CNR computation. Since the approach used in this method is based on ROIs, even using this ROI data in composite, combined in some way to compute the CNR of the complete image, it can provide accurate information on the efficiency of radiology departments and personnel. For such an embodiment, results reporting step S150 (FIGS. 2 and 3) includes generating and, optionally printing or displaying, one or more reports or listings that provide the desired image quality data indexed according to individual or department performance, according to the patient, according to a unit of equipment, or according to a particular imaging practice such as the use of grids, for example. Because CNR is computed for individual ROIs, results reporting can focus on results obtained for particular types of imaging or conditions.

CNR Calculation

CNR expresses a ratio of contrast to noise. Noise in the digital radiographic image content tends to be distributed within the higher spatial frequency range. On the other hand, the data content that relates to anatomy has a relatively broad range distribution of spatial frequency, but with a higher distribution in the lower frequency range. Thus, the noise level can be more readily estimated from the high frequency band(s) of the image.

There are many automated methods that can be used for noise estimation. One method is to calculate the weighted sum of the higher frequency bins of the 2D Fourier spectrum of the input image. The weighting factor increases correspondingly with increases in spatial frequency. One drawback of this method is that the result is the estimate of the overall noise level in the broad region over which the Fourier spectrum is calculated (such as within an ROI). Another method of estimating the noise level is by calculating the standard deviation of pixel values within a small region inside the high frequency band(s) of the input image. This method can provide a pixel-by-pixel noise estimation within each frequency band of each ROI. There are known methods for decomposing the input image into multi-frequency bands, from high to mid to low frequencies. Such methods can use various tools such as Laplacian frequency decomposition, wavelet decomposition, or simple high-frequency band-pass filtering. The resultant frequency bands can be either the same size as the input image or of reduced size, depending on the method being used, on the memory footprint, and on computation speed considerations. To improve the robustness of noise estimation, one can first calculate the noise in the highest frequency band, since the noise magnitude most likely dominates the anatomy details in this band. An estimate of the noise level in the other frequency bands can then be based on electronically stored models established using laboratory-prepared flat field exposures. The overall noise level within a particular frequency band of a ROI can be calculated based on the mean, median, or peak of the local noise standard deviation histogram.

There are a number of possible methods that can be used for contrast calculation. In one embodiment, contrast is computed using the signal dynamic range from histogram data, compiled either from the entire image or from one or more image ROIs. This method can be useful for differentiating images obtained with and without grids, for example. The dynamic range of the histogram can be defined as the range of image pixel values that lie between the minimum and maximum pixel values of the histogram. A more robust estimation can use the pixel value difference between lower (such as 1.0%) and higher (such as 99%) cumulative histogram percentiles.

Spatial frequency analysis also provides a mechanism for contrast computation. After the image is decomposed into a set of frequency bands, the anatomy edge signal content is mostly detectable in the low- to mid-high frequency bands. By calculating the regional pixel value standard deviation from those pixels with magnitude greater than the expected noise level, one can estimate the corresponding anatomy edge magnitude, based on the mean, median, or peak of the standard deviation values.

For images containing multiple diagnostic regions, such as for chest x-rays, the computed CNR must reasonably represent the image quality of these regions. For example, in a thoracic x-ray image, CNR is separately computed from upper lung, mid-lung, lower lung, heart, diaphragm, and upper and lower mediastinum, and from rib and shoulder bone structures.

Automated evaluation of the CNR values can be performed by a trained system, such as by a system using a neural network for learning how to make distinctions according to its results from a base of expert assessments. To do this, a large number of samples are reviewed and scored by radiologists as a training set. Then, radiologist scoring is used as a corrective to adjust the scoring performed by the automated system, to develop workable statistical models for an accurate way to evaluate images. In this manner, CNR values for different ROIs can be graded or scored, and the results used to help evaluate the relative quality of an image for these different ROIs.

A diagnostic image quality score (DIQS) of an image can be computed from the CNR of one or more ROIs in the image. In one embodiment, the DIQS of the image is obtained as an average of CNR values at each of the ROIs in the image. With respect to the example given in FIG. 1, the CNR values for regions 12, 14, 15, 16, 17, and 18 would be averaged. With such an averaging, areas outside of the regions of interest are ignored for the purpose of providing a measure of image quality.

More complex and adaptable arrangements for obtaining a DIQS value are also envisioned. For example, an obtained CNR for an image or for an ROI within an image can be compared against a statistical distribution of CNR values, thus providing a probability measurement of the relative quality of an image. A vector based on one or more CNR values for ROIs within an image can also be calculated and used to determine how closely an image comes to within an acceptable quality range. Other factors that can be relevant for determining the relative diagnostic value of an image can be related to clinical indications about the condition of the patient or other patient metadata.

Figure 5:
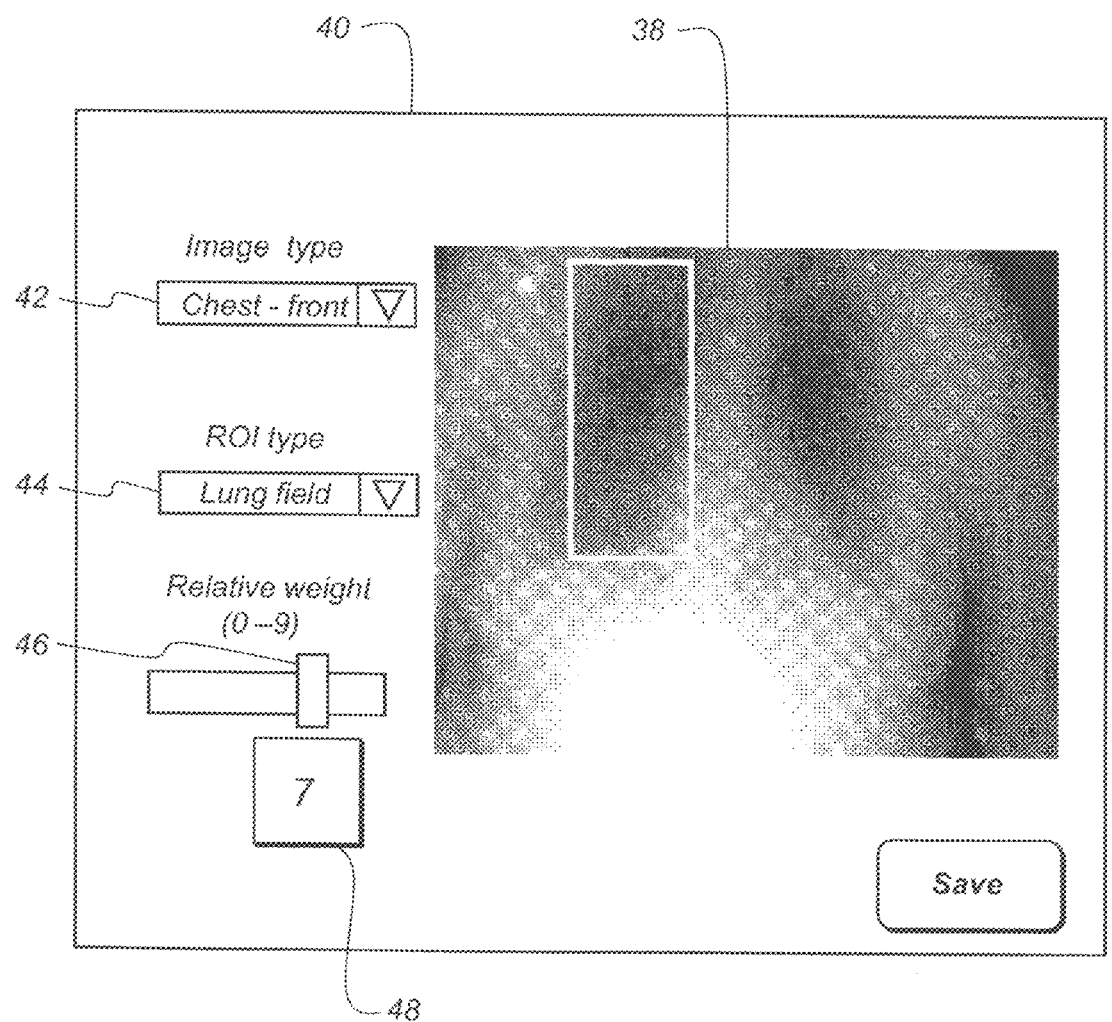
FIG. 5 is a plan view of a graphical user interface (GUI) for assigning weight values to an ROI in an image.

In another embodiment, DIQS can be calculated using information obtained from a viewer entering operator commands. For example, a graphical user interface (GUI), as shown in FIG. 5, allows the viewer to enter operator commands that define the shape, position, and size of an ROI for an image or for one or more types of images in one embodiment. A viewer can also enter commands that assign weight values to different ROIs in an image, to skew the results of averaging or other operation that combines multiple ROIs, for example.

Figure 6:
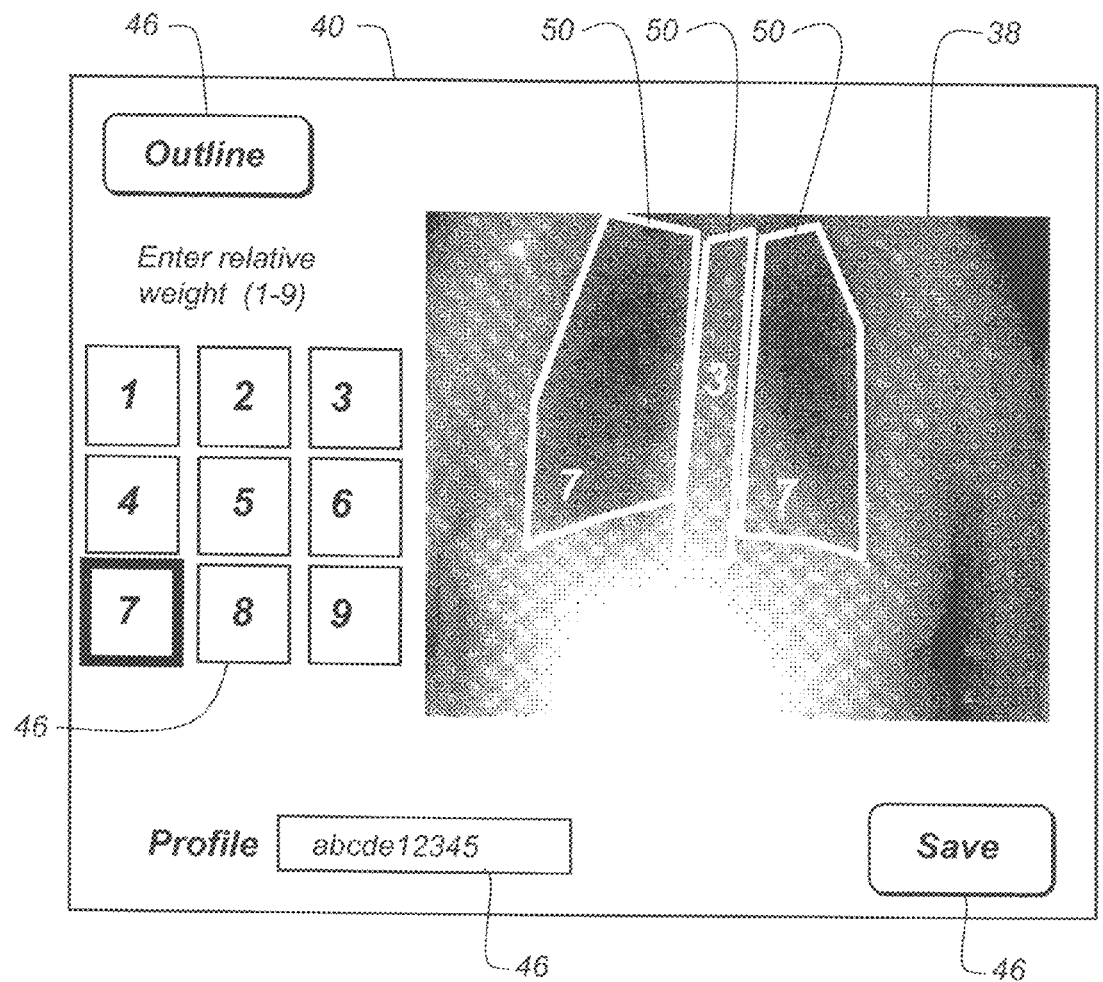
FIG. 6 is a plan view of a graphical user interface (GUI) for assigning weight values and identifying ROI characteristics in an image.

Referring to the GUI of FIG. 5, a benchmark image 38 appears on a display 40 for accepting viewer selection of ROIs and weighting input. Pull-down menus 42 and 44 enable viewer selection of overall type of image and ROI within the image. A control 46 and reporting window 48 enable the viewer to assign and adjust a weight value to each specified ROI type, displayed in benchmark image 38. In the GUI of FIG. 6, the viewer uses a mouse, touchscreen, or other pointing mechanism to manually identify ROIs, tracing the outline of one or more irregularly shaped ROIs 50 on display 40. Various controls 46 enable the viewer to trace the outline, to enter a weighting value, and to name and store the combined data as a type of profile in this embodiment. This arrangement enables multiple profiles for DIQS calculation to be set up and electronically stored, so that a particular weighting can be recalled from memory and applied to image data according to user preference. A default profile could be provided from a library of previously stored profiles and used with any type of image, to allow editing of weighting values in an individual case, for example. Further administrative commands (not shown) would provide capabilities for deleting or editing an existing set of profiles for DIQS calculation based on CNR and other variables. A set of default profiles can be provided with the imaging system software, allowing users at a site to edit, delete, rename, generate, and assign profiles to individual images or to types of images as needed.

In another embodiment, information obtained about the patient can be used to determine how CNR values for each ROI are weighted. A clinical indication of cancer in the patient record, for example, may be used to select a particular weighting for tissues such as lung fields that might be of less interest for a patient who is imaged for a spine or rib study.

Figure 7:
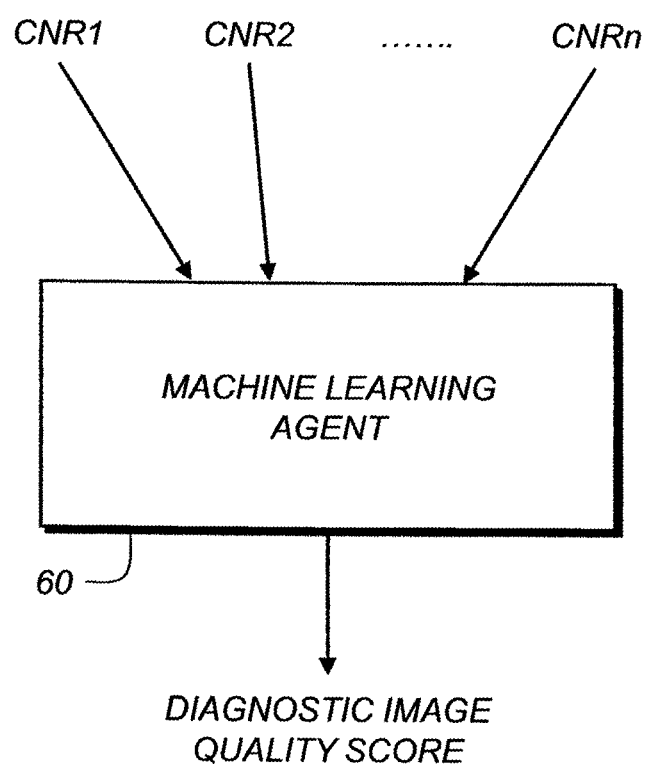
FIG. 7 is a schematic block diagram that shows a machine learning agent that is trained to generate a diagnostic image quality score.

Referring to FIG. 7, a DIQS value can also be derived from learned values, such as by using a machine learning agent 60. In this expert system embodiment of the present invention, machine learning agent 60, trained over a sequence of images with their different CNR values, can learn to provide an output DIQS that closely matches an expert score of an image. To accomplish this, the machine learning agent is first trained using a set of training images. The training step takes the CNRs of ROIs from different images, relevant patient metadata, and an expert's score of the image as input. Expert systems for image evaluation are well known to those skilled in the decision processing arts.

Expert systems training can use a neural network, a support vector machine, or any other suitable machine learning methods to train machine learning agent 60. The trained learning agent 60 takes the CNRs, shown in the example of FIG. 7 as CNR1, CNR2, . . . CNRn, of selected ROIs and patient metadata to derive a DIQS that indicates the image quality for each image. Here, DIQS can be a number obtained using expert scoring, probability factors, or a binary decision. In addition, DIQS is associated with the patient's clinical information (stored in patient metadata). Therefore, the DIQS value for a particular image can vary depending on the diagnostic purpose. For example, a chest PA image may have a blurred lung region but clear spine and rib bone structures. Such a chest image would have a correspondingly high DIQS value for rib study and a low DIQS value for lung study.

The CNR evaluation method of the present invention can be combined with other types of image quality measurements and assessments for radiological imaging. For example, CNR evaluation can be used in conjunction with computer-based methods that assess anatomy cutoff, inadvertent motion detection, and other imaging problems.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10. Image
12, 14, 15, 16, 17, 18. Region of interest (ROI)
20. DR detector
22. Technologist
24. Console
28. Patient
30. Processor
32. Message
38. Benchmark image
40. Display
42, 44. Menu
46. Control
48. Window
50. ROI
60. Machine learning agent
S100. Obtain image step
S110. Obtain metadata step
S120, S122. ROI identification step
S130. Looping step
S132. Image contrast measurement step
S134. Noise level measurement step
S136. Computation step
S138. Computation step
S140. DIQS computation step
S150. Results reporting step
CNR1, CNR2, CNRn. Contrast-to-noise ratio

What is claimed is:

1. A method for determining the image quality of a digital radiographic image for a patient, the method executed at least in part by a computer system and comprising:
   obtaining image data for the digital radiographic image;
   identifying two or more general anatomical regions of interest in the digital radiographic image;
   establishing a predetermined weighting factor for each of the two or more general anatomical regions of interest prior to obtaining said digital radiographic image;
   deriving an image quality score indicative of the quality of the digital radiographic image by integrating the weighting factors and the associated image quality score from each of the two or more general anatomical regions of interest; and
   reporting, displaying, storing, or transmitting the derived image quality score for the image.

2. The method of claim 1 wherein identifying two or more general anatomical regions of interest comprises obtaining information about the medical condition of the patient.

3. The method of claim 1 wherein reporting comprises alerting a technologist to the derived image quality score.

4. The method of claim 1 wherein reporting comprises providing the derived image quality score to a networked computer system.

5. The method of claim 1 wherein the digital radiographic image is in the form of unprocessed data that is read from a digital radiographic detector or scanner.

6. The method of claim 1 wherein the digital radiographic image is a rendered image.

7. The method of claim 1 wherein said weighting factors depend on one or more for the following: user preference; patient profile; contrast to noise values; type of study.

8. The method of claim 1 wherein deriving the image quality score further comprises using an expert system.

9. The method of claim 1 wherein deriving the image quality score further comprises obtaining information on the condition of a patient.

10. The method of claim 1 wherein identifying the two or more anatomical regions of interest comprises obtaining viewer instructions from a graphical user interface.

11. The method of claim 1 wherein reporting the score comprises posting a message on a display.

12. The method of claim 1 wherein reporting the score comprises providing the score to a subsequent process.

13. A method for evaluating a digital radiographic image, executed at least in part by a computer system, comprising:
    obtaining the digital radiographic image for a patient;
    obtaining information about the condition of the patient;
    identifying two or more general anatomical regions of interest in the digital radiographic image according to the obtained information about the condition of the patient and forming a patient profile;
    establishing a predetermined weighting factor for each of the two or more general anatomical regions of interest prior to obtaining said digital radiographic image;
    computing an image quality score indicative of the quality of the digital radiographic image by integrating the weighting factors and the associated image quality score from each of the two or more general anatomical regions of interest according to the profile of the patient; and
    reporting, displaying, storing, or transmitting the derived score.

14. The method of claim 13 wherein reporting the score comprises posting a message on a display.

15. The method of claim 13 wherein reporting the score comprises providing the score to a subsequent process.

16. The method of claim 13 wherein the digital radiographic image is a rendered image.

17. The method of claim 13 wherein the weighting factors depends on one or more for the following: user preference; patient profile; contrast to noise values; type of study.

18. The method of claim 13 wherein values further comprises accepting one or more operator commands for setting up the profile.

19. The method of claim 13 wherein reporting comprises alerting a technologist to the derived image quality score.

20. The method of claim 13 wherein reporting comprises providing the derived image quality score to a networked computer system.

21. The method of claim 13 wherein the digital radiographic image is in the form of unprocessed data that is read from a digital radiographic detector or scanner.

* * * * *